United States Patent
Lee et al.

(10) Patent No.: US 10,629,956 B2
(45) Date of Patent: Apr. 21, 2020

(54) METHOD OF PREPARING LITHIUM SECONDARY BATTERY HAVING IMPROVED HIGH-TEMPERATURE STORAGE CHARACTERISTICS

(71) Applicant: LG Chem, Ltd., Seoul (KR)

(72) Inventors: Jung Min Lee, Daejeon (KR); Young Min Lim, Daejeon (KR); Chul Haeng Lee, Daejeon (KR); Yu Ha An, Daejeon (KR); Yi Jin Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 16/078,916

(22) PCT Filed: Jan. 22, 2018

(86) PCT No.: PCT/KR2018/000954
§ 371 (c)(1),
(2) Date: Aug. 22, 2018

(87) PCT Pub. No.: WO2018/135915
PCT Pub. Date: Jul. 26, 2018

(65) Prior Publication Data
US 2019/0074538 A1 Mar. 7, 2019

(30) Foreign Application Priority Data

Jan. 23, 2017 (KR) .................. 10-2017-0010690
Jan. 19, 2018 (KR) .................. 10-2018-0007057

(51) Int. Cl.
*H01M 10/00* (2006.01)
*H01M 10/058* (2010.01)
(Continued)

(52) U.S. Cl.
CPC .......... *H01M 10/058* (2013.01); *B82Y 40/00* (2013.01); *H01M 4/0447* (2013.01);
(Continued)

(58) Field of Classification Search
CPC ............... H01M 4/0477; H01M 4/625; H01M 10/4235; H01M 10/0567; H01M 10/058; H01M 10/0525
See application file for complete search history.

(56) References Cited

U.S. PATENT DOCUMENTS

2007/0009806 A1    1/2007   Kim
2007/0111093 A1    5/2007   Kashiwagi et al.
(Continued)

FOREIGN PATENT DOCUMENTS

CN      104868169 A    8/2015
JP       2003022804 A    1/2003
(Continued)

OTHER PUBLICATIONS

International Search Report for Application No. PCT/KR2018/000954 dated May 2, 2018.

*Primary Examiner* — Cynthia H Kelly
*Assistant Examiner* — Monique M Wills
(74) *Attorney, Agent, or Firm* — Lerner, David, Littenberg, Krumholz & Mentlik, LLP

(57) ABSTRACT

The present invention relates to a method of preparing a lithium secondary battery which includes preparing a lithium secondary battery, which includes an electrode assembly including a positive electrode, a separator, and a negative electrode, a non-aqueous electrolyte solution, in which the electrode assembly is impregnated, and a battery case accommodating the electrode assembly and the non-aqueous electrolyte solution; performing formation on the lithium secondary battery by charging and discharging the
(Continued)

lithium secondary battery; and degassing, wherein the positive electrode includes a positive electrode active material and carbon nanotubes as a conductive agent, the non-aqueous electrolyte solution includes a lithium salt, an organic solvent, and monofluorobenzene as an additive, and the performing of the formation is performed by charging to a state of charge (SOC) of 65% to 80% while applying a pressure of 0.5 kgf/cm$^2$ to 5 kgf/cm$^2$ at 60° C. to 80° C.

11 Claims, 3 Drawing Sheets

(51) Int. Cl.
*B82Y 40/00* (2011.01)
*H01M 10/04* (2006.01)
*H01M 4/04* (2006.01)
*H01M 4/62* (2006.01)
*H01M 10/0525* (2010.01)
*H01M 10/0567* (2010.01)
*H01M 10/42* (2006.01)
*H01M 10/44* (2006.01)

(52) U.S. Cl.
CPC ......... *H01M 4/625* (2013.01); *H01M 10/049* (2013.01); *H01M 10/0525* (2013.01); *H01M 10/0567* (2013.01); *H01M 10/4235* (2013.01); *H01M 10/446* (2013.01)

(56) References Cited

U.S. PATENT DOCUMENTS

| 2015/0263381 A1* | 9/2015 | Kaneko | H01M 10/052 429/303 |
| 2016/0043389 A1* | 2/2016 | Deguchi | H01M 10/052 429/200 |
| 2016/0181659 A1 | 6/2016 | Long | |
| 2016/0204424 A1* | 7/2016 | Sawai | H01M 4/131 429/332 |

FOREIGN PATENT DOCUMENTS

| JP | 2007207699 A | 8/2007 |
| KR | 20070006253 A | 1/2007 |
| KR | 2015-0043298 A | 4/2015 |

* cited by examiner

METHOD OF PREPARING LITHIUM SECONDARY BATTERY HAVING IMPROVED HIGH-TEMPERATURE STORAGE CHARACTERISTICS

CROSS-REFERENCE TO RELATED APPLICATIONS

The present application is a national phase entry under 35 U.S.C. § 371 of International Application No. PCT/KR2018/000954, filed on Jan. 22, 2018, which claims the benefit of Korean Patent Application Nos. 2017-0010690, filed on Jan. 23, 2017, and 2018-0007057, filed on Jan. 19, 2018, the disclosures of which are incorporated herein by reference.

TECHNICAL FIELD

The present invention relates to a method of preparing a lithium secondary battery having improved high-temperature storage characteristics.

BACKGROUND ART

Recently, interests in energy storage technologies have been increasingly grown, and efforts to research and develop electrochemical devices have been gradually materialized while the application of the energy storage technologies is expanded to mobile phones, camcorders, notebook PCs, and even to electric vehicles.

There emerges an interest in the development of rechargeable secondary batteries among these electrochemical devices, and, particularly, lithium secondary batteries developed in the early 1990's are spotlighted because the lithium secondary batteries are advantageous in that they have higher operating voltage and significantly higher energy density.

After a positive electrode collector and a negative electrode collector are respectively coated with materials, in which a positive electrode active material formed of a lithium-containing transition metal oxide or a carbonaceous negative electrode active material capable of intercalating and deintercalating lithium ions as well as selectively a binder and a conductive agent is mixed, to prepare a positive electrode and a negative electrode, a lithium secondary battery is generally prepared by laminating the positive electrode and the negative electrode on both sides of a separator to form an electrode assembly having a predetermined shape and then inserting the electrode assembly and a non-aqueous electrolyte solution into a battery case. Herein, in order to secure performance of the battery, the battery is almost inevitably subjected to formation and aging processes.

The formation process is a process of activating the secondary battery by repeating charge and discharge after the assembly of the battery, wherein lithium ions deintercalated from the lithium-containing transition metal oxide used as the positive electrode move and are intercalated into the carbonaceous negative electrode active material used as the negative electrode during the charge. In this case, the highly reactive lithium ions react with the electrolyte solution to form compounds, such as $Li_2CO_3$, $Li_2O$, and $LiOH$, and these compounds form a solid electrolyte interface (SEI) on the surface of the negative electrode.

The aging process stabilizes the above-described activated battery by leaving the battery for a predetermined period of time.

Recently, as high-temperature and high-voltage working of the lithium secondary battery is required, gas generation is increased during high-temperature storage while an electrolyte solution decomposition reaction caused by an oxidation reaction between the electrolyte solution and the positive electrode is accelerated, and thus, there is a limitation in that life characteristics are degraded.

In order to address this limitation, there is a need to develop a method of preparing a lithium secondary battery which may reduce the gas generation during high-temperature storage and may simultaneously prevent the reduction of the cycle life characteristics.

PRIOR ART DOCUMENT

Korean Patent Application Laid-open Publication No. 2015-0043298

DISCLOSURE OF THE INVENTION

Technical Problem

An aspect of the present invention provides a method of preparing a lithium secondary battery which may improve high-temperature storage characteristics and cycle life characteristics.

Technical Solution

According to an aspect of the present invention, there is provided a method of preparing a lithium secondary battery which includes:

preparing a lithium secondary battery by accommodating an electrode assembly, which includes a positive electrode, a negative electrode, and a separator disposed between the positive electrode and the negative electrode, and a non-aqueous electrolyte solution, in which the electrode assembly is impregnated, in a battery case;

performing formation on the lithium secondary battery by charging and discharging the lithium secondary battery; and
  degassing, wherein the positive electrode includes a positive electrode active material and carbon nanotubes as a conductive agent, the non-aqueous electrolyte solution includes a lithium salt, an organic solvent, and monofluorobenzene as an additive, and the performing of the formation is performed by charging to a state of charge (SOC) of 65% to 80% while applying a pressure of 0.5 kgf/cm² to 5 kgf/cm² at 60° C. to 80° C.

In the method of preparing a lithium secondary battery of the present invention, the carbon nanotubes included in the positive electrode may include bundle-type carbon nanotubes, and may be included in an amount of 0.1 part by weight to 2 parts by weight based on 100 parts by weight of the positive electrode active material.

Also, the additive may be included in an amount of 0.1 wt % to 14 wt %, particularly 0.1 wt % to 10 wt %, and more particularly 2 wt % to 5 wt % based on a total weight of the non-aqueous electrolyte solution.

Furthermore, the non-aqueous electrolyte solution of the present invention may further include at least one additional additive selected from the group consisting of 1,3-propane sultone, vinylene carbonate, succinonitrile, fluoroethylene carbonate, difluoroethylene carbonate, lithium difluoro(oxalato)borate (LiODFB), pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride.

The additional additive may be included in an amount of 0.01 wt % to 10 wt %, for example, 0.01 wt % to 5 wt % based on the total weight of the non-aqueous electrolyte solution.

Also, the method of the present invention may further include aging before the degassing, after the performing of the formation.

The aging may be performed at a temperature of 60° C. or less.

Specifically, the aging may be performed at room temperature for 3 days or may be performed at a temperature of 60° C. or less for one day.

Advantageous Effects

In the present invention, since a non-aqueous electrolyte solution including monofluorobenzene as an additive is used, gas generation may be reduced by suppressing an oxidation side reaction between a positive electrode and the electrolyte solution through the stabilization of the surface of the positive electrode. Also, accordingly, since a formation process may be performed at a high temperature of about 60° C. or more during the preparation of a lithium secondary battery to increase an electrolyte solution wetting effect, high-temperature storage characteristics and cycle life characteristics of the lithium secondary battery may be improved.

BRIEF DESCRIPTION OF THE DRAWINGS

The following drawings attached to the specification illustrate preferred examples of the present invention by example, and serve to enable technical concepts of the present invention to be further understood together with detailed description of the invention given below, and therefore the present invention should not be interpreted only with matters in such drawings.

MODE FOR CARRYING OUT THE INVENTION

Figure 1:
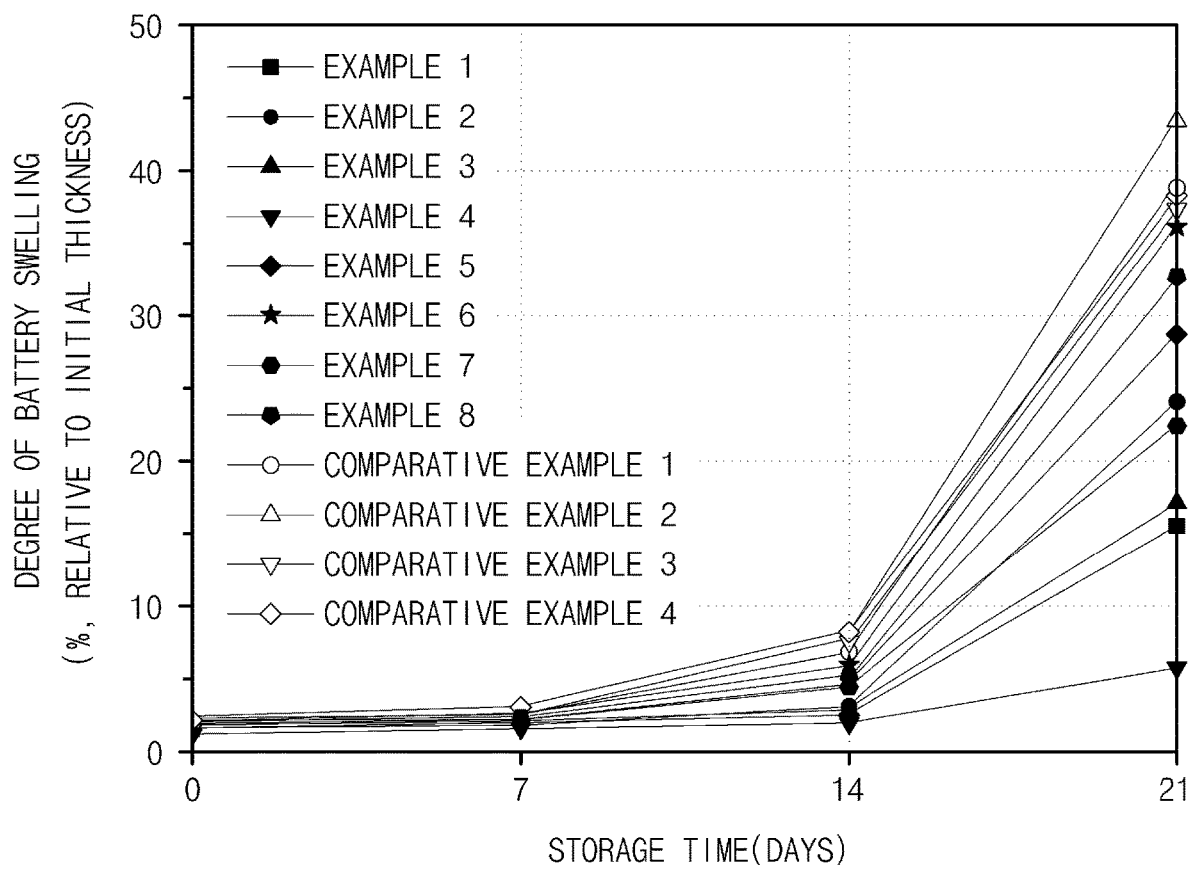
FIG. 1 is a graph illustrating the results of evaluating a thickness increase rate after high-temperature storage according to Experimental Example 1 of the present invention.

Hereinafter, the present invention will be described in more detail.

It will be understood that words or terms used in the specification and claims should be interpreted as having a meaning that is consistent with their meaning in the context of the relevant art and the technical idea of the invention, based on the principle that an inventor may properly define the meaning of the words or terms to best explain the invention.

In general, if a battery is stored at high temperature at a high state of charge (SOC) (charged state) to attain high energy density, an oxidation reaction between electrolyte solution/positive electrode is increased, and thus, it is disadvantageous in that gas generation is increased during high-temperature storage and lifetime is degraded. Particularly, in a case in which highly conductive carbon nanotubes are used as a conductive agent for a positive electrode, since a specific surface area of a positive electrode active material is increased even if a small amount of the carbon nanotubes is used, the oxidation reaction between the positive electrode and the electrolyte solution is increased to increase the gas generation. Since the oxidation reaction is further increased when a formation process is performed at high temperature, deformation, such as swelling and short circuit, of the secondary battery occurs and, furthermore, there is a risk of explosion.

Thus, in an embodiment of the present invention, it was confirmed that, in a case in which a positive electrode using carbon nanotubes, as a conductive agent, was used, gas generation may be reduced by suppressing the oxidation side reaction between the positive electrode and the electrolyte solution through the stabilization of the surface of the positive electrode. In addition, accordingly, since a formation process may be performed at high temperature, a wetting effect on a separator may be increased, and thus, a lithium secondary battery having improved high-temperature storage characteristics and cycle life characteristics may be prepared.

Specifically, in an embodiment of the present invention, provided is a method of preparing a lithium secondary battery which includes:

preparing a lithium secondary battery by accommodating an electrode assembly, which includes a positive electrode, a negative electrode, and a separator disposed between the positive electrode and the negative electrode, and a non-aqueous electrolyte solution, in which the electrode assembly is impregnated, in a battery case;

performing formation on the lithium secondary battery by charging and discharging the lithium secondary battery; and degassing, wherein the positive electrode includes a positive electrode active material and carbon nanotubes as a conductive agent, the non-aqueous electrolyte solution includes a lithium salt, an organic solvent, and monofluorobenzene as an additive, and the performing of the formation is performed by charging to a state of charge (SOC) of 65% to 80% while applying a pressure of 0.5 kgf/cm$^2$ to 5 kgf/cm$^2$ at 60° C. to 80° C.

First, in the method of the present invention, those typically used in the preparation of a lithium secondary battery may all be used as the positive electrode, the negative electrode, and the separator of the lithium secondary battery.

Specifically, the positive electrode, which is used as a structure in the lithium secondary battery of the present invention, may be prepared by forming a positive electrode material mixture layer on a positive electrode collector. The positive electrode material mixture layer may be formed by coating the positive electrode collector with a positive electrode slurry including a positive electrode active material, a conductive agent, and a solvent, and then drying and rolling the coated positive electrode collector.

The positive electrode collector is not particularly limited so long as it has conductivity without causing adverse chemical changes in the battery, and, for example, stainless steel, aluminum, nickel, titanium, fired carbon, or aluminum or stainless steel that is surface-treated with one of carbon, nickel, titanium, silver, or the like may be used.

The positive electrode active material is a compound capable of reversibly intercalating and deintercalating lithium, wherein the positive electrode active material may specifically include a lithium composite metal oxide including lithium and at least one metal such as cobalt, manganese, nickel, or aluminum. Specifically, the lithium composite metal oxide may include lithium-manganese-based oxide (e.g., $LiMnO_2$, $LiMn_2O_4$, etc.), lithium-cobalt-based oxide (e.g., $LiCoO_2$, etc.), lithium-nickel-based oxide (e.g., $LiNiO_2$, etc.), lithium-nickel-manganese-based oxide (e.g., $LiNi_{1-Y}Mn_YO_2$ (where $0<Y<1$), $LiMn_{2-Z}Ni_ZO_4$ (where $0<Z<2$), etc.), lithium-nickel-cobalt-based oxide (e.g., $LiNi_{1-Y1}Co_{Y1}O_2$ (where $0<Y1<1$), lithium-manganese-cobalt-based oxide (e.g., $LiCo_{1-Y2}Mn_{Y2}O_2$ (where $0<Y2<1$), $LiMn_{2-Z1}Co_{Z1}O_4$ (where $0<Z1<2$), etc.), lithium-nickel-manganese-cobalt-based oxide (e.g., $Li(Ni_pCo_qMn_{r1})O_2$ (where $0<p<1$, $0<q<1$, $0<r1<1$, and $p+q+r1=1$) or $Li(Ni_{p1}Co_{q1}Mn_{r2})O_4$ (where $0<p1<2$, $0<q1<2$, $0<r2<2$, and $p1+q1+r2=2$), etc.), or lithium-nickel-cobalt-transition metal (M) oxide (e.g., $Li(Ni_{p2}Co_{q2}Mn_{r3}M_{S2})O_2$ (where M is selected from the group consisting of aluminum (Al), iron (Fe), vanadium (V), chromium (Cr), titanium (Ti), tantalum (Ta), magnesium (Mg), and molybdenum (Mo), and p2, q2, r3, and s2 are atomic fractions of each independent elements, wherein $0<p2<1$, $0<q2<1$, $0<r3<1$, $0<S2<1$, and $p2+q2+r3+S2=1$), etc.), and any one thereof or a compound of two or more thereof may be included.

Among these materials, in terms of the improvement of capacity characteristics and safety of the battery, the lithium composite metal oxide may include $LiCoO_2$, $LiMnO_2$, $LiNiO_2$, lithium nickel manganese cobalt oxide (e.g., $Li(Ni_{1/3}Mn_{1/3}Co_{1/3})O_2$, $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, and $Li(Ni_{0.8}Mn_{0.1}Co_{0.1})O_2$), or lithium nickel cobalt aluminum oxide (e.g., $Li(Ni_{0.8}Co_{0.15}Al_{0.05})O_2$, etc.).

The positive electrode active material may be included in an amount of 80 wt % to 99 wt %, for example, 85 wt % to 95 wt % based on a total weight of solid content in the positive electrode slurry. In a case in which the amount of the positive electrode active material is 80 wt % or less, since energy density is decreased, capacity may be reduced.

Also, the positive electrode may include carbon nanotubes as the conductive agent.

The carbon nanotube is a secondary structure which is formed by assembling a plurality of carbon nanotube units, wherein the carbon nanotube may be a bundle type having the form of a bundle or rope, in which axes in longitudinal directions of the plurality of carbon nanotube units are arranged side by side in substantially the same orientation, or may have an entangled form in which the carbon nanotube units are entangled. Among them, in consideration of excellent dispersibility, the carbon nanotube may be a bundle-type carbon nanotube.

Normally, physical properties of a carbon nanotube may vary depending on crystallinity, structure, and shape of units constituting the carbon nanotube, structure and shape of a secondary particle composed of the units, and an amount of a metallic element included in the carbon nanotube. Accordingly, the carbon nanotube may be allowed to have physical properties required according to the application of the carbon nanotube by cooperatively controlling at least one of the above-described factors. Specifically, the carbon nanotube may exhibit lower resistance as the crystallinity is higher, defects are lower, and the thickness of a wall constituting the carbon nanotube is smaller. Also, the lower the resistance of the carbon nanotube itself is, the lower the resistance in the electrode may be when the carbon nanotubes are used in the preparation of the electrode, and, as a result, battery performance may be improved.

The carbon nanotubes used in the present invention may include at least one of single-walled, double-walled, and multi-walled carbon nanotube units.

Furthermore, the carbon nanotube may have a diameter of the unit of 10 nm to 100 nm and a length of the unit of 3 μm to 10 μm. When the carbon nanotube unit satisfies the above-described diameter and length conditions, the carbon nanotubes may be uniformly dispersed in the positive electrode slurry so that an electrically conductive network may be easily formed.

Also, in addition to the above-described diameter and length conditions, the carbon nanotube, as the secondary particle, may have a specific surface area of 20 $m^2/g$ to 2,000 $m^2/g$. When the specific surface area of the carbon nanotube is less than 20 $m^2/g$, an improvement effect may be insignificant due to a decrease in reaction area, and, when the specific surface area of the carbon nanotube is greater than 2,000 $m^2/g$, the formation of the conductive network may be difficult. Specifically, in consideration of significant improvement due to the control of the specific surface area of the carbon nanotube, the carbon nanotube may have a specific surface area of 100 $m^2/g$ to 400 $m^2/g$.

In the present invention, the specific surface area of the carbon nanotube is measured by a Brunauer-Emmett-Teller (BET) method, wherein the specific surface area may specifically be calculated from an amount of nitrogen gas adsorbed at liquid nitrogen temperature (77K) using a BEL-SORP-mini II by Bell Japan Inc.

The carbon nanotube may have a bulk density of 0.01 $kg/m^3$ to 200 $kg/m^3$, particularly 0.01 $kg/m^3$ to 10 $kg/m^3$, and more particularly 0.01 $kg/m^3$ to 1 $kg/m^3$. The carbon nanotube may exhibit better dispersibility as the bulk density is lower, but, in a case in which the bulk density is excessively low, since the amount of the carbon nanotube units in the electrode is reduced, electrical conductivity in the electrode may be decreased. Since the carbon nanotube used in the present invention has a bulk density within the above-described range, the carbon nanotube may exhibit excellent electrical conductivity. In the present invention, the bulk density of the carbon nanotube may be determined according to Equation 1 below.

$$\text{Bulk density (kg/m}^3\text{)} = \text{carbon nanotube weight (kg)} / \text{carbon nanotube volume (m}^3\text{)} \quad \text{[Equation 1]}$$

In the method of preparing a lithium secondary battery of the present invention, the carbon nanotubes may be commercially purchased and used or may be directly prepared and used. In a case in which the carbon nanotubes are prepared, the carbon nanotubes may be prepared by using a conventional method such as an arc discharge method, a laser ablation method, or a chemical vapor deposition method, and the above-described physical properties may be obtained by controlling the type of a catalyst, heat treatment temperature, and a method of removing impurities during a preparation process.

The carbon nanotubes may be included in an amount of 2 parts by weight or less based on 100 parts by weight of the positive electrode active material. Specifically, the carbon nanotubes may be included in an amount of 0.1 part by weight to 2 parts by weight, for example, 0.3 part by weight to 1.5 parts by weight based on 100 parts by weight of the positive electrode active material.

In a case in which the amount of the carbon nanotubes is less than 0.1 part by weight, there is a concern that output characteristics are reduced due to an increase in resistance and a decrease in conductivity in the positive electrode, and, in a case in which the amount of the carbon nanotubes is greater than 2 parts by weight, since the dispersion of the carbon nanotubes is difficult and the carbon nanotubes block pores in the electrode, there is a concern that the output characteristics are reduced due to an increase in lithium (Li) transfer resistance in the electrolyte solution.

Also, the positive electrode may further include a binder, as a component that assists in the binding between the active material and the conductive agent and in the binding with the current collector, if necessary.

The binder is added in an amount of 1 wt % to 30 wt % based on the total weight of the solid content in the positive electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene terpolymer (EPDM), a sulfonated EPDM, a styrene-butadiene rubber, a fluoro rubber, various copolymers, and the like.

The solvent may include an organic solvent, such as N-methyl-2-pyrrolidone (NMP), and may be used in an amount such that desirable viscosity is obtained when the positive electrode active material, the conductive agent, and selectively the binder are included. For example, the solvent may be included in an amount such that a concentration of the solid content including the positive electrode active material, the conductive agent, and selectively the binder is in a range of 50 wt % to 95 wt %, for example, 70 wt % to 90 wt %.

Subsequently, the negative electrode included in the lithium secondary battery of the method of the present invention may be prepared by forming a negative electrode material mixture layer on a negative electrode collector. The negative electrode material mixture layer may be formed by coating the negative electrode collector with a negative electrode slurry including a negative electrode active material, a binder, a conductive agent, and a solvent, and then drying and rolling the coated negative electrode collector.

The negative electrode collector generally has a thickness of 3 μm to 500 μm. The negative electrode collector is not particularly limited so long as it has high conductivity without causing adverse chemical changes in the battery, and, for example, copper, stainless steel, aluminum, nickel, titanium, fired carbon, copper or stainless steel that is surface-treated with one of carbon, nickel, titanium, silver, or the like, an aluminum-cadmium alloy, or the like may be used. Also, similar to the positive electrode collector, the negative electrode collector may have fine surface roughness to improve bonding strength with the negative electrode active material, and the negative electrode collector may be used in various shapes such as a film, a sheet, a foil, a net, a porous body, a foam body, a non-woven fabric body, and the like.

Furthermore, the negative electrode active material may include at least one selected from the group consisting of lithium metal, a carbon material capable of reversibly intercalating/deintercalating lithium ions, metal or an alloy of lithium and the metal, a metal composite oxide, a material which may be doped and undoped with lithium, and a transition metal oxide.

As the carbon material capable of reversibly intercalating/deintercalating lithium ions, a carbon-based negative electrode active material generally used in a lithium ion secondary battery may be used without particular limitation, and, as a typical example, crystalline carbon, amorphous carbon, or both thereof may be used. Examples of the crystalline carbon may be graphite such as irregular, planar, flaky, spherical, or fibrous natural graphite or artificial graphite, and examples of the amorphous carbon may be soft carbon (low-temperature sintered carbon) or hard carbon, mesophase pitch carbide, and fired cokes.

As the metal or the alloy of lithium and the metal, a metal selected from the group consisting of copper (Cu), nickel (Ni), sodium (Na), potassium (K), rubidium (Rb), cesium (Cs), francium (Fr), beryllium (Be), magnesium (Mg), calcium (Ca), strontium (Sr), silicon (Si), antimony (Sb), lead (Pb), indium (In), zinc (Zn), barium (Ba), radium (Ra), germanium (Ge), aluminum (Al), and tin (Sn), or an alloy of lithium and the metal may be used.

One selected from the group consisting of PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, $Bi_2O_5$, $Li_xFe_2O_3$ (0≤x≤1), $Li_xWO_2$ (0≤x≤1), and $Sn_xMe_{1-x}Me'_yO_z$ (Me: manganese (Mn), Fe, Pb, or Ge; Me': Al, boron (B), phosphorus (P), Si, Groups I, II and III elements of the periodic table, or halogen; 0<x≤1; 1≤y≤3; 1≤z≤8) may be used as the metal composite oxide.

The material, which may be doped and undoped with lithium, may include Si, $SiO_x$ (0<x<2), a Si—Y alloy (where Y is an element selected from the group consisting of alkali metal, alkaline earth metal, a Group 13 element, a Group 14 element, transition metal, a rare earth element, and a combination thereof, and is not Si), Sn, $SnO_2$, and Sn—Y (where Y is an element selected from the group consisting of alkali metal, alkaline earth metal, a Group 13 element, a Group 14 element, transition metal, a rare earth element, and a combination thereof, and is not Sn), and a mixture of $SiO_2$ and at least one thereof may also be used. The element Y may be selected from the group consisting of Mg, Ca, Sr, Ba, Ra, scandium (Sc), yttrium (Y), Ti, zirconium (Zr), hafnium (Hf), rutherfordium (Rf), V, niobium (Nb), Ta, dubidium (Db), Cr, Mo, tungsten (W), seaborgium (Sg), technetium (Tc), rhenium (Re), bohrium (Bh), Fe, Pb, ruthenium (Ru), osmium (Os), hassium (Hs), rhodium (Rh), iridium (Ir), palladium (Pd), platinum (Pt), Cu, silver (Ag), gold (Au), Zn, cadmium (Cd), B, Al, gallium (Ga), Sn, In, Ge, P, arsenic (As), Sb, bismuth (Bi), sulfur (S), selenium (Se), tellurium (Te), polonium (Po), and a combination thereof.

The transition metal oxide may include lithium-containing titanium composite oxide (LTO), vanadium oxide, and lithium vanadium oxide.

The negative electrode active material may be included in an amount of 80 wt % to 99 wt % based on a total weight of solid content in the negative electrode slurry.

The binder is a component that assists in the binding between the conductive agent, the active material, and the current collector, wherein the binder is commonly added in an amount of 1 wt % to 30 wt % based on the total weight of the solid content in the negative electrode slurry. Examples of the binder may be polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, an ethylene-propylene-diene polymer (EPDM), a sulfonated EPDM, a styrene-butadiene rubber, a fluoro rubber, and various copolymers thereof.

The conductive agent is a component for further improving the conductivity of the negative electrode active material, wherein the conductive agent is added in an amount of 1 wt % to 30 wt % based on the total weight of the solid content in the negative electrode slurry.

Any conductive agent may be used without particular limitation so long as it has conductivity without causing adverse chemical changes in the battery, and, for example, a conductive material, such as: carbon powder such as carbon black, acetylene black, Ketjen black, channel black, furnace black, lamp black, or thermal black; graphite powder such as natural graphite with a well-developed crystal structure, artificial graphite, or graphite; conductive fibers such as carbon fibers or metal fibers; metal powder such as fluorocarbon powder, aluminum powder, and nickel powder; conductive whiskers such as zinc oxide whiskers and potassium titanate whiskers; conductive metal oxide such as titanium oxide; or polyphenylene derivatives, may be used. Specific examples of a commercially available conductive agent may be acetylene black-based products (Chevron Chemical Company, Denka black (Denka Singapore Private Limited), or Gulf Oil Company), Ketjen black, ethylene carbonate (EC)-based products (Armak Company), Vulcan XC-72 (Cabot Company), and Super P (Timcal Graphite & Carbon).

The solvent may include water or an organic solvent, such as NMP and alcohol, and may be used in an amount such that desirable viscosity is obtained when the negative electrode active material as well as selectively the binder and the conductive agent are included. For example, the solvent may be included in an amount such that a concentration of the solid content in the negative electrode slurry including the negative electrode active material as well as selectively the binder and the conductive agent is in a range of 50 wt % to 75 wt %, for example, 50 wt % to 65 wt %.

Next, in the method of the present invention, after an electrode assembly is prepared by disposing a separator between the prepared positive electrode and negative electrode, a step of accommodating the electrode assembly in a battery case and injecting a non-aqueous electrolyte solution may be performed.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or in a lamination therewith as the separator, and a typical porous nonwoven fabric, for example, a nonwoven fabric formed of high melting point glass fibers or polyethylene terephthalate fibers may be used, but the present invention is not limited thereto.

Also, in the method of preparing a lithium secondary battery of the present invention, the non-aqueous electrolyte solution may include a lithium salt, an organic solvent, and monofluorobenzene as an additive.

Any lithium salt typically used in an electrolyte for a lithium secondary battery may be used as the lithium salt without limitation, and, for example, the lithium salt may include $Li^+$ as a cation, and may include at least one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $B_{10}Cl_{10}^-$, $BF_2C_2O_4^-$, $BC_4O_8^-$, $PF_4C_2O_4^-$, $PF_2C_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $CH_3SO_3^-$, $CF_3(CF_2)_7SO_3^-$, $CF_3CO_2^-$, $CH_3CO_2^-$, $SCN^-$, and $(CF_3CF_2SO_2)_2N^-$ as an anion. One thereof or a mixture of two or more thereof, if necessary, may be used as the lithium salt. The lithium salt may be appropriately changed in a normally usable range, but may be included in a concentration of 0.8 M to 2 M, for example, 0.8 M to 1.5 M in the non-aqueous electrolyte solution to obtain an optimum effect of forming an anti-corrosion film on the surface of the electrode.

Furthermore, the non-aqueous organic solvent is not limited as long as it may minimize decomposition due to an oxidation reaction during charge and discharge of the secondary battery and may exhibit desired characteristics with an additive. For example, an ether-based solvent, an ester-based solvent, or an amide-based solvent may be used alone or in mixture of two or more thereof.

As the ether-based solvent among the organic solvents, any one selected from the group consisting of dimethyl ether, diethyl ether, dipropyl ether, methylethyl ether, methylpropyl ether, and ethylpropyl ether, or a mixture of two or more thereof may be used, but the present invention is not limited thereto.

Also, the ester-based solvent may include at least one compound selected from the group consisting of a cyclic carbonate compound, a linear carbonate compound, a linear ester compound, and a cyclic ester compound.

Among these compounds, specific examples of the cyclic carbonate compound may be any one selected from the group consisting of ethylene carbonate (EC), propylene carbonate (PC), 1,2-butylene carbonate, 2,3-butylene carbonate, 1,2-pentylene carbonate, 2,3-pentylene carbonate, vinylene carbonate, and fluoroethylene carbonate (FEC), or a mixture of two or more thereof.

Furthermore, specific examples of the linear carbonate compound may be any one selected from the group consisting of dimethyl carbonate (DMC), diethyl carbonate (DEC), dipropyl carbonate, ethyl methyl carbonate (EMC), methylpropyl carbonate, and ethylpropyl carbonate, or a mixture of two or more thereof, but the present invention is not limited thereto.

Specific examples of the linear ester compound may be any one selected from the group consisting of methyl acetate, ethyl acetate, propyl acetate, methyl propionate, ethyl propionate, propyl propionate, and butyl propionate, or a mixture of two or more thereof, but the present invention is not limited thereto.

Specific examples of the cyclic ester compound may be any one selected from the group consisting of γ-butyrolactone, γ-valerolactone, γ-caprolactone, σ-valerolactone, and ε-caprolactone, or a mixture of two or more thereof, but the present invention is not limited thereto.

Among the ester-based solvents, the cyclic carbonate, such as ethylene carbonate and propylene carbonate, which is known to well dissociate the lithium salt in the electrolyte due to high permittivity as a highly viscous organic solvent, may be used, and an electrolyte solution having high electrical conductivity may be prepared when the above cyclic carbonate is mixed with the low viscosity, low permittivity linear carbonate, such as dimethyl carbonate and diethyl carbonate, in an appropriate ratio and used. Particularly, it is more preferable to mix and use the carbonate-based solvent having high ionic conductivity and high permittivity, which may improve charge and discharge performance of the battery, with a propionate-based solvent.

Also, the monofluorobenzene included as a non-aqueous electrolyte solution additive is a low-polarity liquid component with low viscosity, wherein the monofluorobenzene may be included in an amount of 0.1 wt % to 14 wt %, particularly 0.1 wt % to 10 wt %, and more particularly 2 wt % to 5 wt % based on a total weight of the electrolyte solution.

Since the monofluorobenzene is included in the non-aqueous electrolyte solution within the above range, the monofluorobenzene is adsorbed on the surface of the positive electrode to be able to form a protective layer, and, as a result, the monofluorobenzene may stabilize the surface of the positive electrode and may suppress an increase in interfacial resistance. Furthermore, since the monofluorobenzene may suppress dissolution of the transition metal on the surface of the positive electrode to prevent electrodeposition of the dissolved metal on the surface of the negative electrode, a stable solid electrolyte interface (SEI) may be formed on the surface of the negative electrode. Thus, the monofluorobenzene may suppress a side reaction between the electrolyte solution and the positive electrode or negative electrode during high-voltage and high-temperature charge of the lithium secondary battery, and, accordingly, the decomposition of the electrolyte solution due to the side reaction or the generation of gases, such as CO, $CO_2$, $CH_4$, and $C_2H_6$, may be reduced.

Particularly, since the monofluorobenzene is included within the above range, the formation process may be performed at high temperature, and thus, a uniform charged state may be achieved by further improving the wetting effect on the separator. Therefore, high-temperature storage characteristics and cycle life characteristics of the lithium secondary battery may be improved.

In this case, when the amount of the monofluorobenzene is greater than 14 wt %, the gas generation reducing effect may be further improved, but, since a side reaction due to the use of excessive amount of the additive may occur, resistance of the battery may be increased. Also, in a case in which the amount of the monofluorobenzene is less than 0.1 wt %, since a stable SEI may not be formed on the surface of the electrode, the gas generation reducing effect may be insignificant.

Furthermore, in the method of preparing a lithium secondary battery of the present invention, in order to improve lifetime characteristics of the battery, suppress the reduction in battery capacity, and improve discharge capacity of the battery, the non-aqueous electrolyte solution may further include at least one additional additive, for example, 1,3-propane sultone (PS), vinylene carbonate (VC), succinonitrile (SN), a halo-alkylene carbonate-based compound, such as fluoroethylene carbonate (FEC) or difluoroethylene carbonate, lithium difluoro(oxalato)borate (LiODFB), pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, or aluminum trichloride, in addition to the monofluorobenzene, if necessary.

The additional additives may be included in an amount of 0.01 wt % to 10 wt %, particularly 0.01 wt % to 5 wt %, and more particularly 0.01 wt % to 3 wt % based on the total weight of the non-aqueous electrolyte solution. If the amount of the additional additives is less than 0.01 wt %, effects of improving low-temperature output, high-temperature storage characteristics, and high-temperature life characteristics of the battery may be insignificant, and, if the amount of the additional additives is greater than 10 wt %, there is possibility that the side reaction in the electrolyte may excessively occur during the charge and discharge of the battery. Particularly, since the additional additives may not be sufficiently decomposed at high temperature when the additional additives are excessively added, the additional additives may be present in the form of an unreacted material or precipitates in the electrolyte at room temperature. Accordingly, a side reaction, by which cycle life of the secondary battery is reduced, may occur.

Also, in the method of preparing a lithium secondary battery of the present invention, a shape of the battery case is not particularly limited, but a cylindrical type or a prismatic type using a can, a pouch type, or a coin type may be included, and the pouch type may be specifically included.

The method of preparing a lithium secondary battery of the present invention may further include a step of sealing the battery case after injecting the non-aqueous electrolyte solution into the battery case.

Furthermore, in the method of preparing a lithium secondary battery of the present invention, an activation step, in which initial charge or charge and discharge is performed after the injecting of the non-aqueous electrolyte solution into the battery case, that is, a formation step may be performed.

The formation step is a step of forming an SEI on the surface of the negative electrode by partial charge and discharge to activate the battery, wherein the formation step may be performed by charging to a state of charge (SOC) of 65% to 80% while applying a pressure of 0.5 $kgf/cm^2$ to 5 $kgf/cm^2$, for example, 1 $kgf/cm^2$ to 5 $kgf/cm^2$ at 60° C. to 80° C.

Currently, in a case in which a formation step is performed at high temperature during the preparation of a secondary battery, since the oxidation reaction between the electrode and the electrolyte solution is increased to generate gas and deformation of the secondary battery occurs, it is generally recommended that the formation step is performed at a low temperature of less than 60° C. However, in a case in which the formation step is performed at less than 60° C., since the wetting of the electrolyte solution is reduced, the high-temperature storage characteristics and cycle life characteristics may be reduced.

In the method of the present invention, since the non-aqueous electrolyte solution including monofluorobenzene is used, a stable protective layer is formed on the surface of the positive electrode to be able to suppress the side reaction between the electrolyte solution and the positive electrode even during high-voltage and high-temperature charge, and thus, the formation step may be performed at a temperature of 60° C. or more. Therefore, according to the method of the present invention, the wetting effect of the electrolyte solution may be further improved.

In this case, the formation step may be performed at less than 80° C. in order to prevent the reduction of the gas generation reducing effect due to the evaporation of the monofluorobenzene.

Also, in the method of the present invention, the formation step may be performed while applying a pressure of 0.5 $kgf/cm^2$ to 5 $kgf/cm^2$, for example, 1 $kgf/cm^2$ to 5 $kgf/cm^2$. In a case in which the pressure is less than 0.5 $kgf/cm^2$, since the pressure does not sufficiently push gas that is generated at high temperature, uniformity of the protective layer formed on the surface of the electrode may be reduced due to the gas generation. Furthermore, in a case in which the pressure is greater than 5 $kgf/cm^2$, since the electrolyte solution to be remained in the battery is excessively discharged due to the excessive pressure, it may adversely affect long-term lifetime.

Also, in order to form an SEI on the negative electrode and simultaneously secure an amount of the remaining electrolyte solution, the formation step may be performed in a state of charge (SOC) range of 65% to 80%, for example, 60% to 75%. If the formation step is performed at a SOC of less than 65%, the securement of the amount of the remaining electrolyte solution and wetting may not be sufficient. If the formation step is performed at a SOC of greater than 80%, since the pressure may be applied at high temperature for a long period of time to form an excessively high charge state, decomposition of the electrolyte solution and gas generation may occur. Thus, a uniform SEI may not be formed on the surface of the negative electrode and, furthermore, the electrolyte solution may be discharged.

Furthermore, after the formation process, the method of preparing a lithium secondary battery of the present invention may further include an aging step for stabilizing the battery before a degassing step, if necessary.

The aging step may be performed at a temperature of 60° C. or less. Specifically, the aging step may be performed at room temperature (25±5° C.) for 3 days or may be performed at a temperature of 60° C. or less, for example, 40° C. to 60° C. for one day. In a case in which the aging process is performed at a low temperature of less than 20° C., an effect of improving wetting in the secondary battery may be insignificant and, in a case in which the aging process is performed at a temperature of greater than 60° C., the electrolyte solution may be evaporated or the side reaction between the electrolyte solution and the positive electrode may occur.

Also, in the method of preparing a lithium secondary battery according to the present invention, a degassing process for removing gas may be performed after the aging process. The degassing process may be performed by a conventional method, and gas, which is generated in the aging step and may subsequently cause a swelling phenomenon of the battery, as well as gas, such as carbon dioxide and methane, generated during the formation of the SEI in the formation step may be removed in advance by the degassing process.

Furthermore, in an embodiment of the present invention, a lithium secondary battery prepared by the method of the present invention may be provided.

The lithium secondary battery includes an electrode assembly including a positive electrode, a negative electrode, and a separator disposed between the positive electrode and the negative electrode, a non-aqueous electrolyte solution, in which the electrode assembly is impregnated, and a battery case accommodating the electrode assembly and the non-aqueous electrolyte solution, wherein the positive electrode may include carbon nanotubes as a conductive agent, and the non-aqueous electrolyte solution may include a lithium salt, an organic solvent, and monofluorobenzene as an additive.

In this case, the lithium secondary battery may include a lithium metal secondary battery, a lithium ion secondary battery, a lithium polymer secondary battery, or a lithium ion polymer secondary battery.

Hereinafter, the present invention will be described in more detail according to examples. However, the invention may be embodied in many different forms and should not be construed as being limited to the embodiments set forth herein. Rather, these example embodiments are provided so that this description will be thorough and complete, and will fully convey the scope of the present invention to those skilled in the art.

EXAMPLES

I. Secondary Battery Preparation

Example 1

(Non-Aqueous Electrolyte Solution Preparation)

A non-aqueous electrolyte solution of the present invention was prepared by adding 3 g of monofluorobenzene to g of a non-aqueous organic solvent (ethylene carbonate (EC): propylene carbonate (PC):propylene propionate (PP)=volume ratio of 3:1:6) in which 1 M $LiPF_6$ was dissolved (see Table 1 below).

(Positive Electrode Preparation)

A positive electrode active material (lithium cobalt oxide ($LiCoO_2$)) a conductive agent (bundle-type carbon nanotubes (manufactured by LG Chem, No.:B.CNT)), and a binder (polyvinylidene fluoride) were added to N-methyl-2-pyrrolidone (NMP) at a weight ratio of 97.7:0.3:2 to prepare a positive electrode slurry (solid content of 50 wt %). One surface of a 20 μm thick positive electrode collector (Al thin film) was coated with the positive electrode slurry, dried, and roll-pressed to prepare a positive electrode (see Table 1 below).

(Negative Electrode Preparation)

A negative electrode active material (graphite), a conductive agent (carbon black), and a binder (polyvinylidene fluoride) were added to distilled water at a weight ratio of 97:0.5:2.5 to prepare a negative electrode slurry (solid content of 80%). One surface of a 10 μm thick copper (Cu) thin film, as a negative electrode collector, was coated with the negative electrode slurry, dried, and roll-pressed to prepare a negative electrode.

(Secondary Battery Preparation)

After an electrode assembly was prepared by a typical method in which the positive electrode and negative electrode prepared by the above-described methods were sequentially stacked with a polyethylene porous film, the electrode assembly was accommodated in a pouch type secondary battery case, and the case was sealed after injecting the above-prepared non-aqueous electrolyte solution thereinto.

Subsequently, after a formation process was performed by charging to a SOC of 65% at a rate of 0.7 C while applying a pressure of 5 kgf/cm² at 60° C., aging was performed at 60° C. for one day, and a degassing process for removing gas generated in the battery case was then performed to prepare a lithium secondary battery (see Table 1 below).

Example 2

A pouch-type secondary battery was prepared in the same manner as in Example 1 except that 0.5 g of monofluorobenzene was added to 99.5 g of an organic solvent during the preparation of the non-aqueous electrolyte solution (see Table 1 below).

Example 3

A pouch-type secondary battery was prepared in the same manner as in Example 1 except that a positive electrode active material (lithium cobalt oxide ($LiCoO_2$)), a conductive agent (bundle-type carbon nanotubes (manufactured by LG Chem, No.:B.CNT)), and a binder (polyvinylidene fluoride) were mixed at a weight ratio of 97.5:1.2:1.3 during the preparation of the positive electrode (see Table 1 below).

Example 4

A pouch-type secondary battery was prepared in the same manner as in Example 1 except that 3 g of monofluorobenzene and 10 g of an additional additive (vinylene carbonate:propane sultone:fluoroethylene carbonate:succinonitrile:lithium difluoro(oxalato)borate=weight ratio of 0.5:3:4:5:

0.5) were added to 87 g of an organic solvent during the preparation of the non-aqueous electrolyte solution (see Table 1 below).

Example 5

A pouch-type secondary battery was prepared in the same manner as in Example 1 except that a formation process was performed at 80° C. during the preparation of the secondary battery (see Table 1 below).

Example 6

A pouch-type secondary battery was prepared in the same manner as in Example 1 except that 0.1 g of monofluorobenzene was added to 99.9 g of an organic solvent during the preparation of the non-aqueous electrolyte solution.

Example 7

A pouch-type secondary battery was prepared in the same manner as in Example 1 except that 10 g of monofluorobenzene was added to 90 g of an organic solvent during the preparation of the non-aqueous electrolyte solution.

Example 8

A pouch-type secondary battery was prepared in the same manner as in Example 1 except that 15 g of monofluorobenzene was added to 85 g of an organic solvent during the preparation of the non-aqueous electrolyte solution.

Comparative Example 1

A pouch-type secondary battery was prepared in the same manner as in Example 1 except that monofluorobenzene was not included during the preparation of the non-aqueous electrolyte solution (see Table 1 below).

Comparative Example 2

A pouch-type secondary battery was prepared in the same manner as in Example 1 except that 10 g of an additional additive (vinylene carbonate:propane sultone:fluoroethylene carbonate:succinonitrile:lithium difluoro(oxalato)borate weight ratio of 0.5:3:4:5:0.5) was added to 90 g of an organic solvent during the preparation of the non-aqueous electrolyte solution and a formation process was performed at 25° C. during the preparation of the secondary battery (see Table 1 below).

Comparative Example 3

A pouch-type secondary battery was prepared in the same manner as in Example 1 except that a formation process performed at 25° C. during the preparation of the secondary battery (see Table 1 below).

Comparative Example 4

A pouch-type secondary battery was prepared in the same manner as in Example 7 except that a formation process was performed at 25° C. during the preparation of the secondary battery (see Table 1 below).

TABLE 1

| | Non-aqueous electrolyte solution | | | Positive electrode | Formation process conditions | | |
|---|---|---|---|---|---|---|---|
| | | Additive | | | | | |
| | Non-aqueous organic solvent | Amount of monofluorobenzene added | Amount of additional additive added | Weight ratio of positive electrode active material:conductive agent:binder | Temperature (° C.) | Pressure (kgf/cm$^2$) | SOC (%) |
| | Type (volume ratio) | Amount added (g) | (g) | (g) | | | | |
| Example 1 | EC:PC:PP = 3:1:6 | 97 | 3 | — | 97.7:0.3:2 | 60° C. | 5 | 65 |
| Example 2 | EC:PC:PP = 3:1:6 | 99.5 | 0.5 | — | 97.7:0.3:2 | 60° C. | 5 | 65 |
| Example 3 | EC:PC:PP = 3:1:6 | 97 | 3 | — | 97.5:1.2:1.3 | 60° C. | 5 | 65 |
| Example 4 | EC:PC:PP = 3:1:6 | 87 | 3 | 10 | 97.7:0.3:2 | 60° C. | 5 | 65 |
| Example 5 | EC:PC:PP = 3:1:6 | 97 | 3 | — | 97.7:0.3:2 | 80° C. | 5 | 65 |
| Example 6 | EC:PC:PP = 3:1:6 | 99.9 | 0.1 | — | 97.7:0.3:2 | 60° C. | 5 | 65 |
| Example 7 | EC:PC:PP = 3:1:6 | 90 | 10 | — | 97.7:0.3:2 | 60° C. | 5 | 65 |
| Example 8 | EC:PC:PP = 3:1:6 | 85 | 15 | — | 97.7:0.3:2 | 60° C. | 5 | 65 |
| Comparative Example 1 | EC:PC:PP = 3:1:6 | 100 | — | — | 97.7:0.3:2 | 60° C. | 5 | 65 |
| Comparative Example 2 | EC:PC:PP = 3:1:6 | 90 | — | 10 | 97.7:0.3:2 | 25° C. | 5 | 65 |
| Comparative Example 3 | EC:PC:PP = 3:1:6 | 97 | 3 | — | 97.7:0.3:2 | 25° C. | 5 | 65 |
| Comparative Example 4 | EC:PC:PP = 3:1:6 | 90 | 10 | — | 97.7:0.3:2 | 25° C. | 5 | 65 |

Experimental Examples

Experimental Example 1: Evaluation of Thickness Increase Rate after High Temperature Storage After the secondary batteries prepared in Examples 1 to 8 and the secondary batteries prepared in Comparative Examples 1 to 4 were respectively charged to 4.40 V, the secondary batteries were heated from room temperature to 60° C. at a rate of 1° C./min and were stored at 60° C. for about 3 weeks, and the temperature was then decreased to room temperature for 3 hours.

A thickness increase rate (%) (degree of swelling due to gas generation) of each battery according to storage time relative to an initial battery thickness was measured, and the results thereof are presented in FIG. 1 below.

Referring to FIG. 1, with respect to the secondary batteries prepared in Examples 1 to 8 which were prepared by performing the formation step, in which each battery was charged to a SOC of 65% while applying a pressure of 5 $kgf/cm^2$ at 60° C. or 80° C., while using the non-aqueous electrolyte solution including monofluorobenzene as an additive, it may be understood that the degree of battery swelling due to gas generation was about 36% or less relative to an initial storage value even if each battery was stored at high temperature for a long period of time.

In this case, with respect to the secondary battery of Example 6 which included the non-aqueous electrolyte solution including 0.1 wt % of monofluorobenzene, since an effect of preventing the side reaction between the positive electrode and the electrolyte solution was insignificant, it may be understood that the degree of battery swelling was larger than those of the secondary batteries of Examples 1 to 5, 7, and 8. With respect to the secondary battery of Example 8 which included the non-aqueous electrolyte solution including an excessive amount, i.e., 15 wt % of monofluorobenzene, since resistance was increased to reduce a gas reducing effect, it may be understood that the degree of batter swelling was larger than those of the secondary batteries of Examples 1 to 5 and 7.

With respect to the secondary batteries of Comparative Examples 1 and 2 which included the non-aqueous electrolyte solution without monofluorobenzene, since the oxidation side reaction between the positive electrode and the electrolyte solution occurred, the secondary batteries of Comparative Examples 1 and 2 generated a larger amount of gas than the secondary batteries of Examples 1 to 8, and thus, it may be understood that the degrees of battery swelling were larger than those of the secondary batteries of Examples 1 to 8.

Also, with respect to the secondary batteries of Comparative Examples 3 and 4 in which the formation step was performed at 25° C. while using the non-aqueous electrolyte solution including monofluorobenzene, since an electrolyte solution wetting effect was reduced, it may be understood that the degrees of batter swelling were larger than those of the secondary batteries of Examples 1 to 8.

Experimental Example 2: Evaluation of Resistance Increase Rate after High Temperature Storage After the secondary batteries prepared in Examples 1 to 8 and Comparative Examples 1 to 4 were respectively charged to 4.40 V, the secondary batteries were heated from room temperature to 80° C. at a rate of 1° C./min and were stored at 60° C. for about 3 weeks, and the temperature was then decreased to room temperature for 3 hours.

An alternating current (AC) resistance increase rate (%) of each secondary battery according to storage time relative to initial resistance was measured by electrochemical impedance spectroscopy (EIS), and the results thereof are presented in FIG. 2 below.

Figure 2:
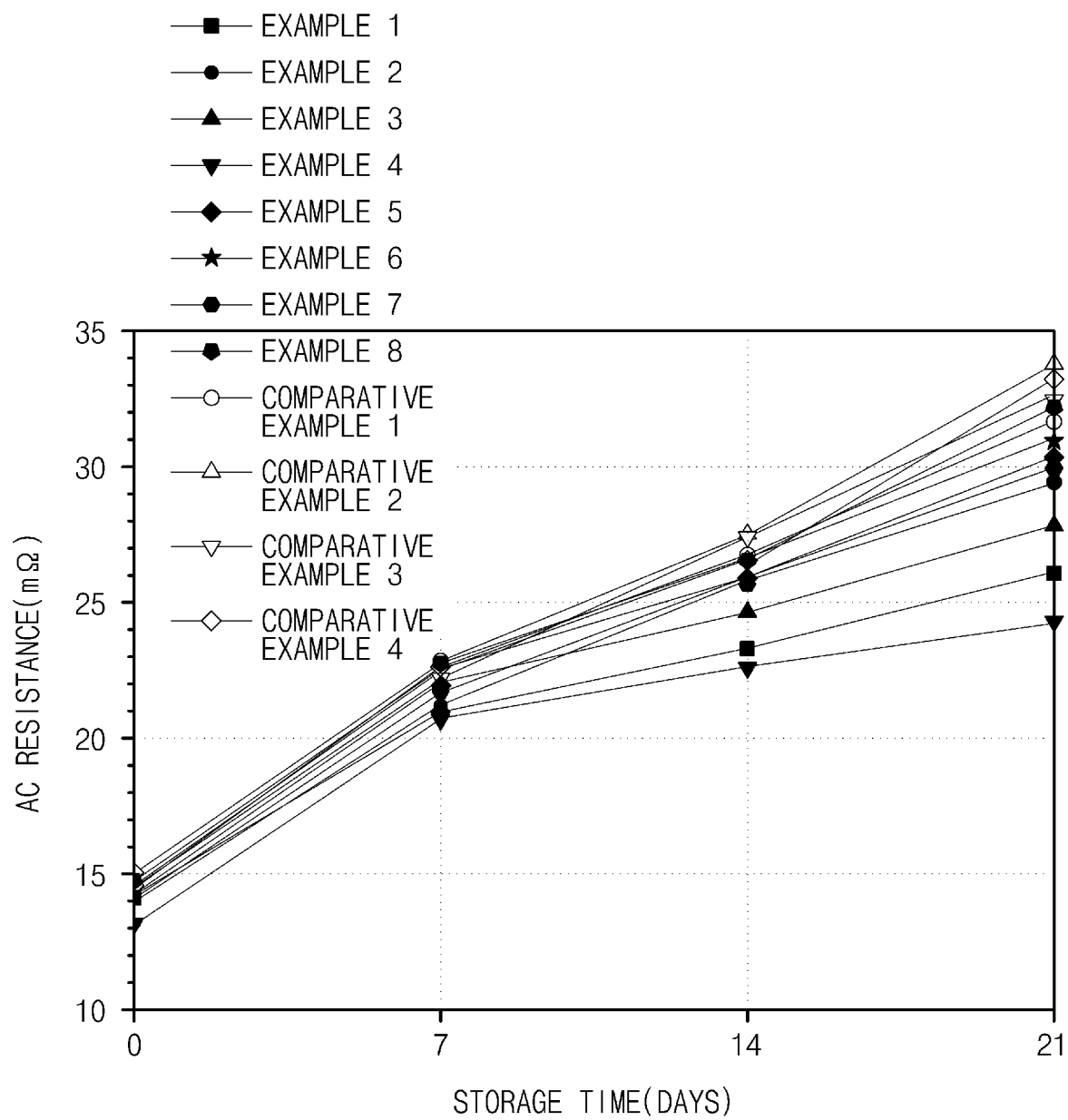
FIG. 2 is a graph illustrating the results of evaluating a resistance increase rate after high-temperature storage according to Experimental Example 2 of the present invention.

Referring to FIG. 2, with respect to the secondary batteries of Examples 1 to 7 which were prepared by performing the formation step, in which each battery was charged to a SOC of 65% while applying a pressure of 5 $kgf/cm^2$ at 60° C. or 80° C., while using the non-aqueous electrolyte solution including monofluorobenzene as an additive, it may be understood that an increase in resistance was low at less than 31% even if each battery was stored at high temperature for a long period of time.

In this case, it may be understood that the secondary battery of Example 8, which included the non-aqueous electrolyte solution including an excessive amount of monofluorobenzene, had a larger resistance increase rate than the secondary batteries of Examples 1 to 7.

Also, it may be understood that the secondary battery of Comparative Example 1, which was prepared by performing the formation process at 60° C. while using the non-aqueous electrolyte solution without an additive, the secondary battery of Comparative Example 2, which was prepared by performing the formation process at 25° C. while using the non-aqueous electrolyte solution only including an additional additive without monofluorobenzene, and the secondary batteries of Comparative Examples 3 and 4, which were prepared by performing the formation process at 25° C. while using the non-aqueous electrolyte solution including monofluorobenzene, each had a larger resistance increase rate than the secondary batteries of Examples 1 to 7.

Experimental Example 3: Cycle Life Characteristics Measurement

After each of the secondary batteries prepared in Examples 1 and 3 and Comparative Example 2 was charged and discharged 60 times or more at room temperature under conditions of 0.8 C/0.5 C, residual discharge capacities were measured, and the results thereof are presented in FIG. 3 below.

Figure 3:
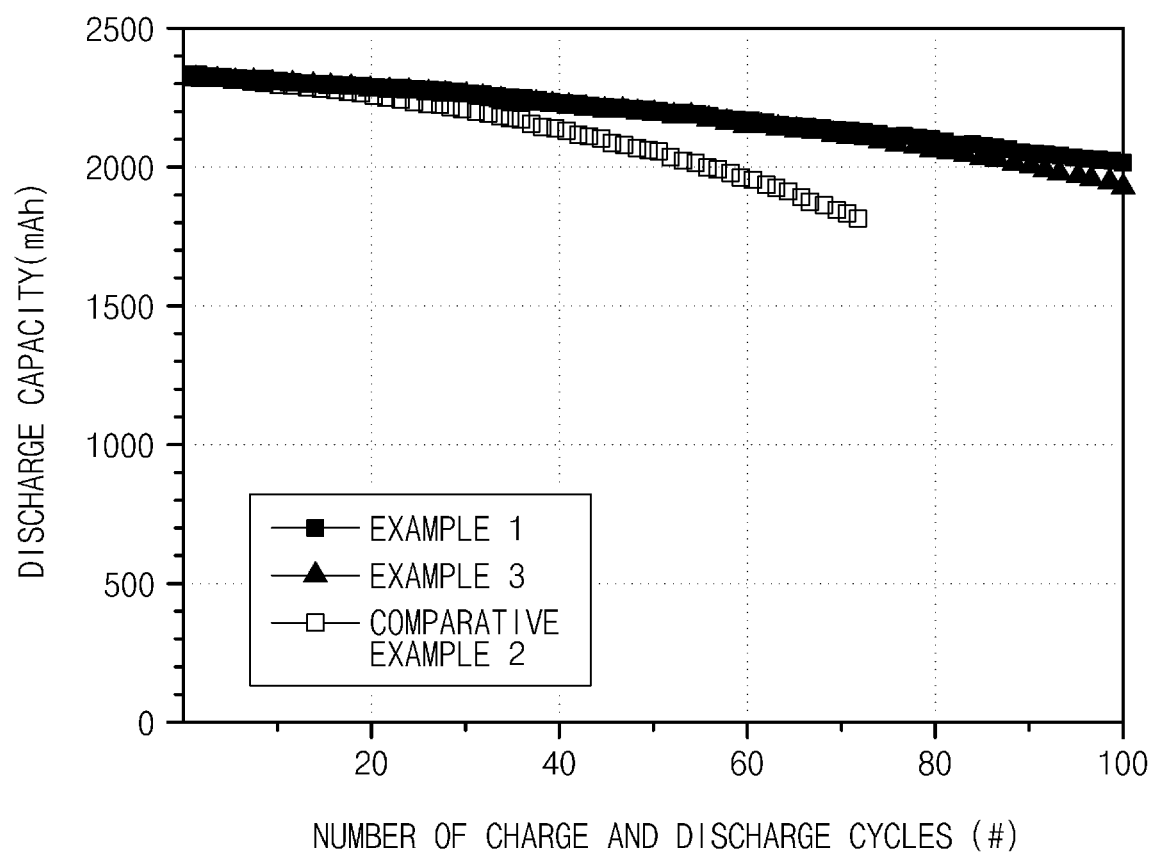
FIG. 3 is a graph illustrating the results of measuring discharge capacity according to Experimental Example 3 of the present invention.

As illustrated in FIG. 3, with respect to the secondary batteries of Examples 1 and 3, the residual discharge capacities were not significantly reduced even if the charge and discharge were repeated 100 times, but, with respect to the secondary battery of Comparative Example 2 which included the non-aqueous electrolyte solution without monofluorobenzene, it may be confirmed that the residual discharge capacity was rapidly reduced after 40 charge and discharge cycles.

Thus, it may be expected that cycle life characteristics of the secondary battery prepared in Comparative Example 2 were lower than those of the secondary batteries of Examples 1 and 3 which included the electrolyte solution including monofluorobenzene.

The invention claimed is:

1. A method of preparing a lithium secondary battery, the method comprising:
    performing a formation on a lithium secondary battery by charging and discharging the lithium secondary battery, wherein the formation is performed by charging to a state of charge (SOC) of 65% to 80% while applying a pressure of 0.5 $kgf/cm^2$ to 5 $kgf/cm^2$ at 60° C. to 80° C.; and
    degassing the lithium secondary battery after the formation, wherein the lithium secondary battery includes an electrode assembly in a battery case,
wherein the electrode assembly includes a positive electrode, a negative electrode, and a separator disposed between the positive electrode and the negative electrode,
wherein the positive electrode comprises a positive electrode active material and carbon nanotubes as a conductive agent,
wherein the electrode assembly is impregnated with a non-aqueous electrolyte solution, and
wherein the non-aqueous electrolyte solution comprises a lithium salt, an organic solvent, and monofluorobenzene as an additive.

2. The method of claim 1, wherein the carbon nanotubes are in the form of a secondary structure having a plurality of carbon nanotubes bundled together.

3. The method of claim 1, wherein the carbon nanotubes are included in an amount of 0.1 part by weight to 2 parts by weight based on 100 parts by weight of the positive electrode active material.

4. The method of claim 1, wherein the additive is included in an amount of 0.1 wt % to 14 wt % based on a total weight of the non-aqueous electrolyte solution.

5. The method of claim 4, wherein the additive is included in an amount of 0.1 wt % to 10 wt % based on the total weight of the non-aqueous electrolyte solution.

6. The method of claim 5, wherein the additive is included in an amount of 2 wt % to 5 wt % based on the total weight of the non-aqueous electrolyte solution.

7. The method of claim 1, wherein the non-aqueous electrolyte solution further comprises at least on additional additive selected from the group consisting of 1,3-propane sultone, vinylene carbonate, succinonitrile, fluoroethylene carbonate, difluoroethylene carbonate, lithium difluoro(oxalato)borate, pyridine, triethylphosphite, triethanolamine, cyclic ether, ethylenediamine, n-glyme, hexaphosphoric triamide, a nitrobenzene derivative, sulfur, a quinone imine dye, N-substituted oxazolidinone, N,N-substituted imidazolidine, ethylene glycol dialkyl ether, an ammonium salt, pyrrole, 2-methoxy ethanol, and aluminum trichloride.

8. The method of claim 7, wherein the additional additive is included in an amount of 0.01 wt % to 10 wt % based on a total weight of the non-aqueous electrolyte solution.

9. The method of claim 8, wherein the additional additive is included in an amount of 0.01 wt % to 5 wt % based on the total weight of the non-aqueous electrolyte solution.

10. The method of claim 1, further comprising aging before the degassing, after the performing of the formation.

11. The method of claim 10, wherein the aging is performed at room temperature (25±5° C.) for 3 days or is performed at a temperature of 60° C. or less for one day.

* * * * *